Feb. 13, 1968  L. M. JOHNSTON, JR., ET AL  3,368,427
THROTTLE VALVE CONTROL DEVICE FOR AUTOMATIC TRANSMISSION
Filed May 6, 1965  3 Sheets-Sheet 1

Inventors
Lawrence M. Johnston, Jr.
Robert D. Dickmeyer
Robert J. Loubier
Farrel L. Kroll
Frederick J. Kube
Attorney Feb. 13, 1968  L. M. JOHNSTON, JR., ET AL  3,368,427
THROTTLE VALVE CONTROL DEVICE FOR AUTOMATIC TRANSMISSION
Filed May 6, 1965                                3 Sheets-Sheet 2
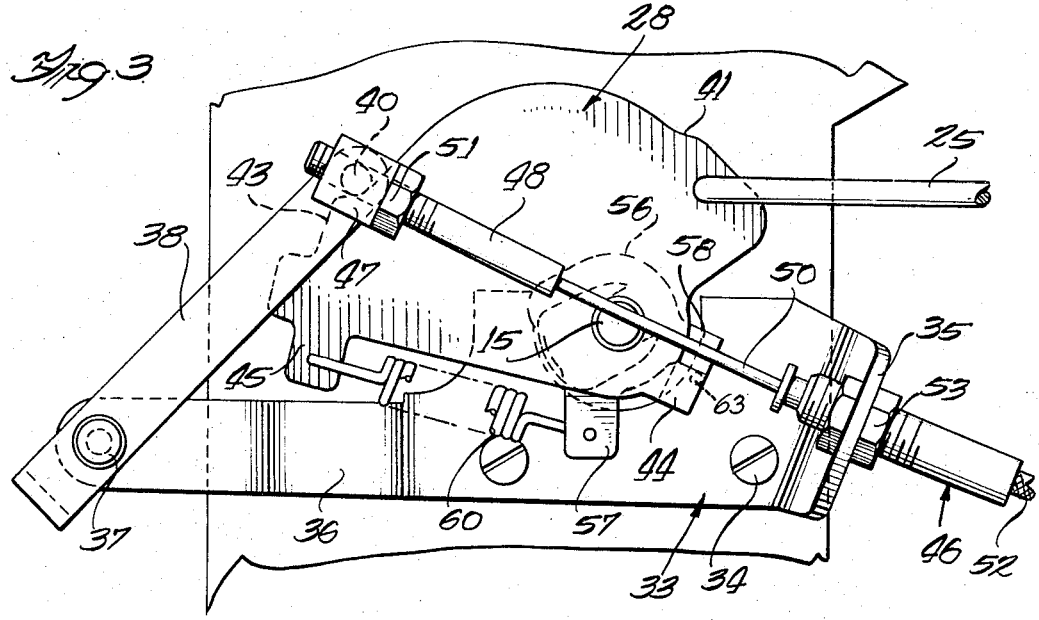
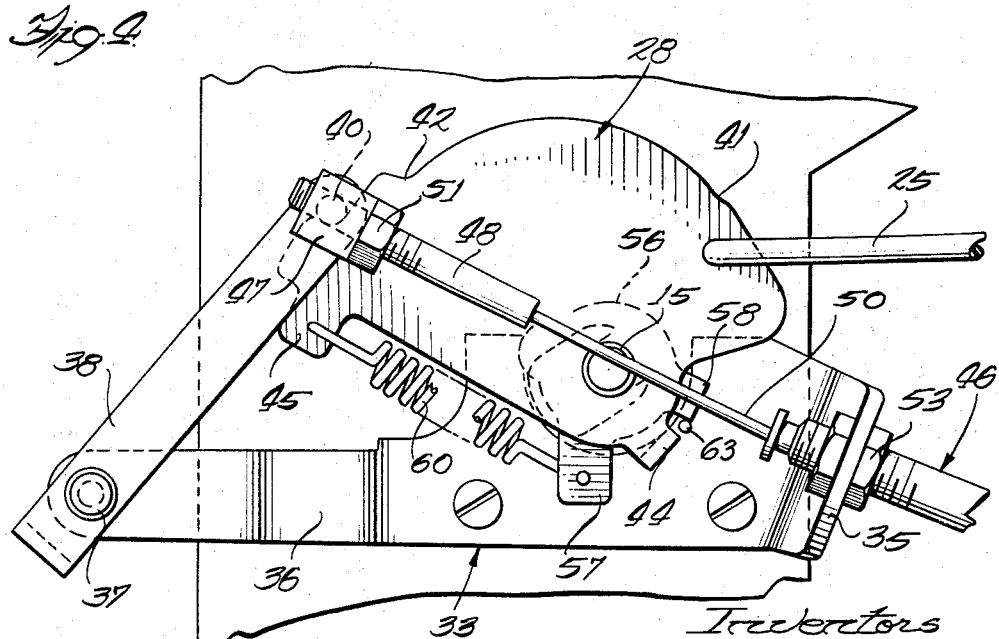
Inventors
Lawrence M. Johnston, Jr.
Robert D. Dickmeyer
Robert J. Loubier
Farrel L. Krall
Frederick J. Krub
Attorney

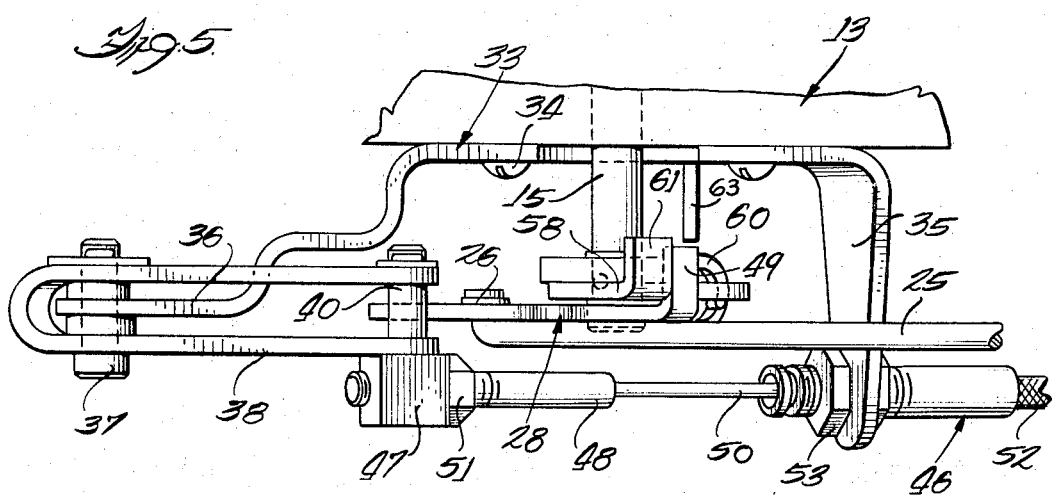
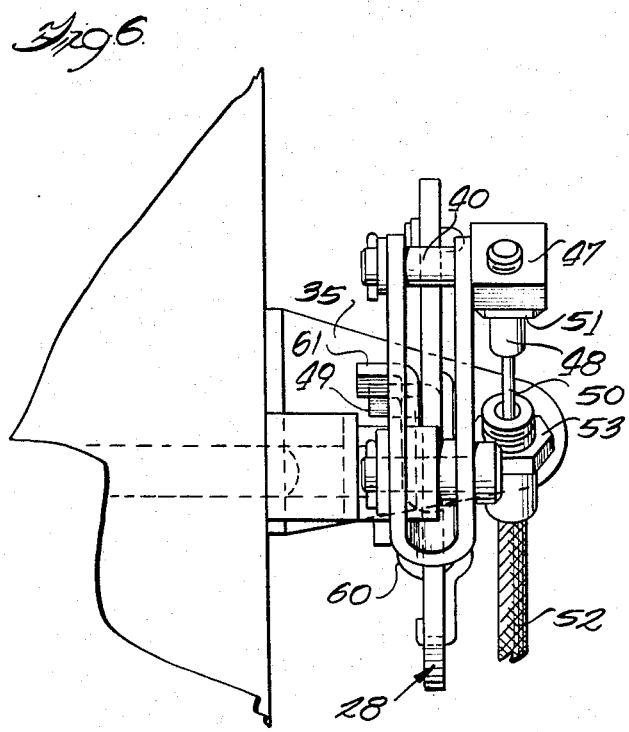

United States Patent Office 3,368,427
Patented Feb. 13, 1968

3,368,427
THROTTLE VALVE CONTROL DEVICE
FOR AUTOMATIC TRANSMISSION
Lawrence M. Johnston, Jr., Robert D. Dickmeyer, and Robert J. Loubier, Fort Wayne, Ind., and Farrel L. Krall, Wilshire, Ohio, assignors to International Harvester Company, a corporation of Delaware
Filed May 6, 1965, Ser. No. 453,720
4 Claims. (Cl. 74—867)

ABSTRACT OF THE DISCLOSURE

A device incorporated in a motor vehicle having an automatic transmission for controlling the operation of the carburetor throttle valve of the engine as well as the throttle valve of the transmission which includes a throttle lever fixed to the carburetor throttle valve shaft, a cam follower lever operatively connected to the transmission throttle valve, and a rotatable plate-like cam coacting with the throttle lever and said portion corresponding to the fully opened position of the carburetor throttle valve, said coacting formations on the throttle lever and throttle valve cam being separable during such latter rotational movement of the throttle valve cam against the resilient action of said resilient means to cause pivoting of said follower lever independently of any swinging movement of said throttle lever from its second angular position.

---

This invention relates to throttle valve control devices for automatic transmissions and has reference more particularly to an improved control for carburetor and transmission throttle valves which will be highly efficient in operation although simple in design and embodying relatively few parts.

The operation of an automatic transmission requires that the transmission sense the output of the engine so that the proper gear ratio can be selected for optimum engine performance. Heretofore throttle valve linkage has been provided for connecting the carburetor throttle valve control lever with a lever on the outside of the automatic transmission, generally termed the transmission throttle valve control lever. As the carburetor opening is increased the transmission control lever is rotated in the proper direction to produce a shifting of the transmission gears in keeping with the output torque of the engine. In addition to the foregoing the operation of the throttle valve linkage causes the oil pressure in the transmission clutches and/or brakes to increase to provide the clutch and/or brake capacity for the increased torque output.

However, these linkage devices as heretofore constructed and used have not been entirely satisfactory. The numerous parts are subject to excessive wear and an overtravel feature is generally embodied in the devices which adds additional parts to the design. A further disadvantage resides in the fact that the conventional throttle valve linkage devices require different bellcranks and cross shaft assemblies for different outlet locations of the carburetor throttle shaft.

The invention has for its principal object to provide a throttle valve cam in combination with a cable assembly for connecting the carburetor throttle lever with the transmission throttle valve control lever, thereby eliminating the linkage as previously employed so that the number of parts can be considerably reduced, although a high efficiency is obtained and without loss of any of the necessary features required of devices of this nature.

Another object is to provide a throttle valve cam having operative connected relation with the carburetor throttle shaft and wherein said cam has a surface contour such that the transmission control lever is actuated in a manner conforming to the opening and closing action of the carburetor throttle valve. For example, when the carburetor throttle valve is in substantially closed position for idling, the hydraulic pressures regulated by the transmission control valve will be at a minimum and when the throttle valve is in a position corresponding to its wide open position, the pressures regulated by the transmission control lever will be at a maximum.

Another object is to provide a throttle valve cam in combination with a cable assembly for the purposes described wherein the camming surface provided by the cam can be developed in an accurate and precise manner for achieving the desired relationship of carburetor opening with transmission throttle valve control lever position.

Another object is to provide a throttle valve cam which will have a surface contour providing a detent ramp portion in addition to having the developed cam surface for the desired operation from a substantially closed to a fully open carburetor throttle position. The detent ramp portion on the throttle valve cam coacts with the carburetor throttle lever and cable assembly in a unique manner permitting rotation of the cam beyond a full throttle position so that rotation of the transmission control lever can take place for certain desired control purposes, notwithstanding that the carburetor throttle valve is held against a stop in its fully open position. The detent also functions to provide "feel" to the operator to inform him when he is at full throttle position.

With these and various other objects in view, the invention may consist of certain novel features of construction and operation as will be more fully described and particularly pointed out in the specification, drawings and claims appended thereto.

In the drawings which illustrate an embodiment of the device and wherein like reference characters are used to designate like parts:

FIGURE 3 is a side elevational view on the same scale as FIGURE 2 but showing the throttle valve cam and cable assembly in full throttle position;

FIGURE 4 is a side elevational view on the same scale as FIGURES 2 and 3 but showing the throttle valve cam and cable assembly in a through detent position;

FIGURE 5 is a top view looking down on the cam and cable structure with the parts being positioned as shown in FIGURE 2; and FIGURE 6 is an end elevational view of the cam and cable structure of the invention as shown in FIGURE 5.

Figure 1:
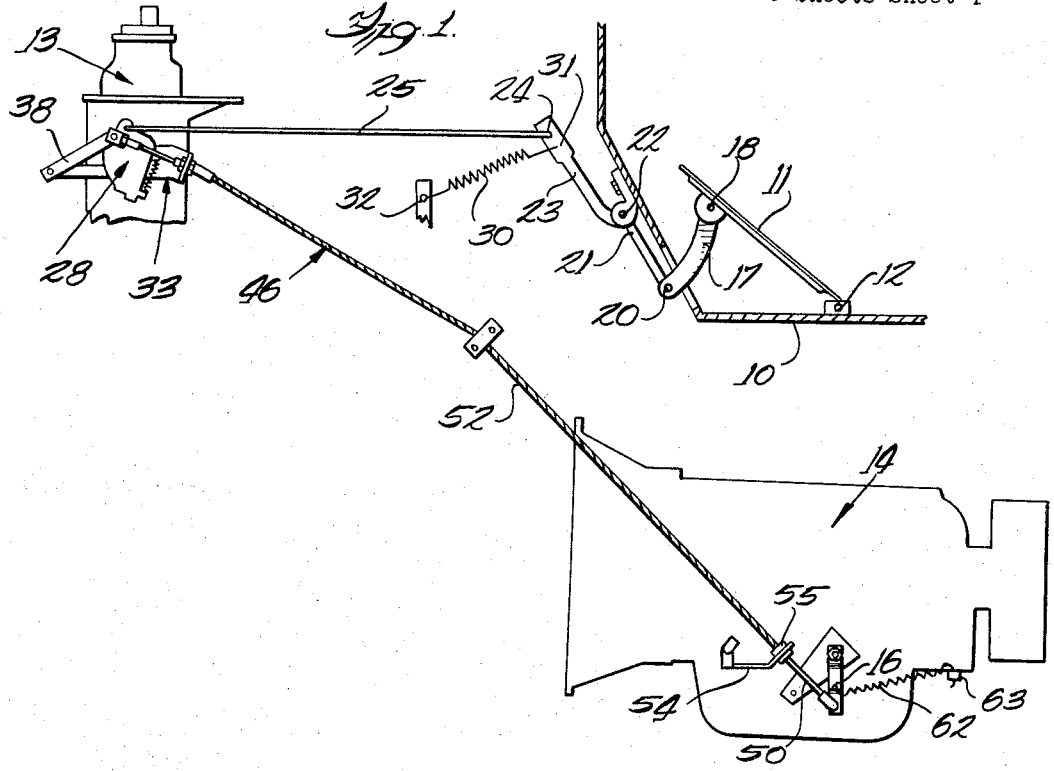
FIGURE 1 is a side view of an automotive engine having a carburetor and an automatic transmission, and showing the throttle valve control device of the invention incorporated therewith in one operational position.

The automotive engine shown in FIGURE 1 of the drawings and which has been selected for illustrating the present invention, includes floor boards such as 10 having the conventional accelerator pedal 11 pivoted thereto at 12. The carburetor is identified by the numeral 13 and the automatic transmission by the numeral 14. The carburetor has a throttle shaft 15, FIGURE 5, which extends outwardly from one side of the carburetor. The said shaft is rotatable and the same has the usual carburetor throttle valve, not shown, fixed thereto. By rotating the throttle valve of the carburetor through rotation of shaft 15 it is possible to control the supply of fuel to the engine. The automatic transmission 14 is provided with the control lever 16 which controls the shifting of the gears in the transmission to and from high and low speed ratios.

The link 17 is pivoted at 18 to the underside of the accelerator pedal 11 and said link at its lower end is pivotally secured at 20 to the arm 21 of a bellcrank lever supported for oscillating movement at 22. The other arm 23 of the bellcrank lever is pivotally secured at 24 to a connecting rod 25 which is pivotally joined at 26 to the throttle valve cam 28. The cam 28 is journalled on the shaft 15 for rotation independently of the shaft. The parts are yieldingly maintained in a throttle closed position as shown in FIGURE 1 by the coil spring 30 which is secured at 31 to the arm 23 and at its opposite end to the fixed standard 32. A tension spring 62 is secured to lever 16 and to anchor bracket 63 which is attached to the automatic transmission 14, and maintains tension on cable 50 which insures continual coaction of the transmission control lever 16 in reference to the clockwise and counterclockwise rotation of throttle valve cam 28. When the operator presses down on the accelerator pedal the bellcrank lever and connecting link will be actuated to effect rotation of the throttle valve cam 28 in a clockwise direction. Rotation of the cam in this direction will cause an opening movement of the carburetor throttle valve to progressively feed more fuel to the engine until a full throttle position is reached. Also, this clockwise rotation of the cam 28 will effect actuation of the cable assembly to produce similar clockwise rotation of the transmission control lever 16. When the operator lifts his foot from the accelerator pedal, the coil springs 30 and 62 take over and the cam 28 and also lever 16 are rotated in a counterclockwise direction and the parts are thus returned to their initial position.

Figure 2:
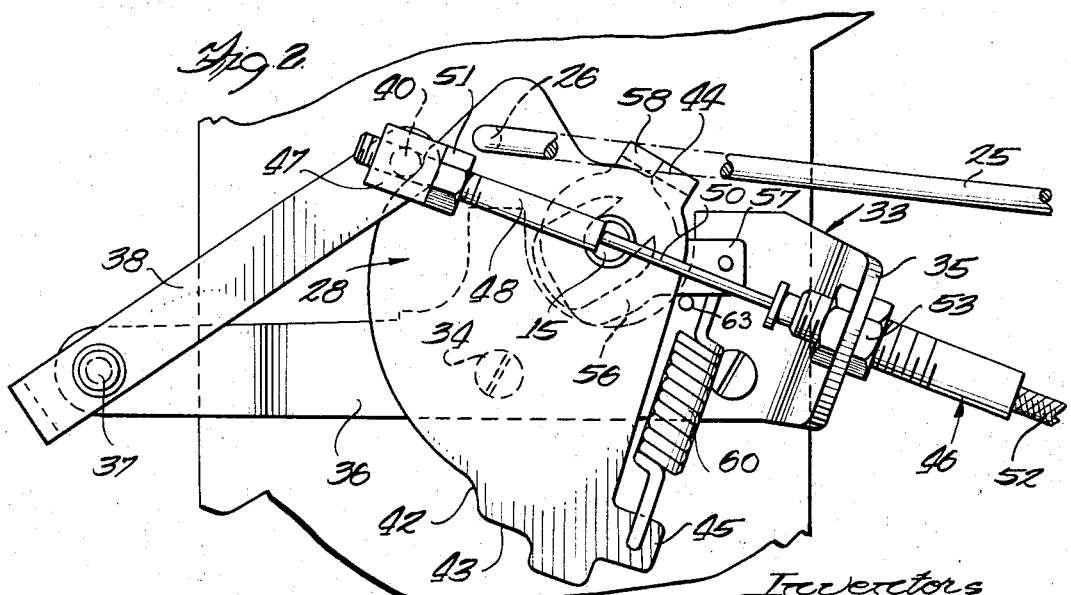
FIGURE 2 is an enlarged side elevational view showing the throttle valve cam, the cam follower lever and cable assembly all as illustrated in FIGURE 1.

As best shown in FIGURES 2, 3 and 4 a metal support bracket 33 is fixed at 34 to the body or housing of the carburetor 13 and said support bracket provides a flange 35 and an extension 36. The extension receives a pivot member 37 which pivotally connects the follower lever 38 to the fixed support bracket 33. At the upper end of the follower lever 38, which lever is substantially in the shape of a U, the same carries a pin 40 which rides on the cam surface provided by the throttle valve cam 28. The contour surface of the cam as best shown in FIGURES 3 and 4 includes a relatively shallow cavity 41, a deeper cavity or detent ramp 42 and a through ramp portion 43. Also, the cam is formed with integral spaced lugs 44 and 45, the lug 44 having an overhanging flange 49 integral therewith, FIGURE 5, the function and operation of which will be explained as the description proceeds.

The rotation of the cam is transmitted to the lever 16 of the transmision 14 by a cable assembly including a Bowden wire control indicated by numeral 46. The pin 40 is formed with an enlarged head 47 and the threaded end 48 of the Bowden wire 50 is threaded in the pivot head 47 and held in locked position by the nut 51. This pivotally connects the wire 50 at the carburetor end to the follower lever 38. The Bowden wire 50 extends through an outer casing 52, FIGURE 1, which at one end is secured by the nuts 53 to the flange 35 of the fixed support 33 and at its opposite end to the bracket 54 by the nuts 55. The bracket 54 is in turn fixed to the housing of the transmission 14. The Bowden wire projects from the transmission end of the casing and is pivotally secured to the transmission control lever 16. The cable assembly operatively connects the throttle valve cam 28 with the transmission control lever 16 so that oscillating movements of the cam are transmitted to the lever. The surface of the cam between cavities 41 and 42 can be precisely contoured for the particular automotive engine to which the parts are applied. This is possible since the present control can be designed to produce the desired relationship between the carburetor throttle opening and the transmission throttle valve control lever setting for all positions of the cam.

The oscillating movements of said cam in addition to being transmitted to the lever 16 are also applied to a carburetor throttle plate 56 which is fixed to the shaft 15 so that the plate and shaft rotate in unison for opening and closing the throttle valve of the carburetor. The plate 56 is formed with an integral radially projecting lug 57 and with a second lug 58. The lug 58 has an overhanging flange 61 which is interposed in the path of the overhanging flange 49, FIGURE 5, integral with the lug 44 of cam 28. The overhanging flange 49 and the overhanging flange 61 on the lug 58 are adapted to have contact. This contact between the overhanging flange 49 and the overhanging flange 61 of the lug 58 is effected by the coil spring 60 which connects the carburetor throttle plate or lever 56 with the cam 28. The coil spring is connected at one end to the lug 45 of the cam 28, and at its opposite end the spring connects with the lug 57 of the carburetor throttle plate or lever 56. Thus during rotation of the cam in a clockwise direction, during which the pin 40 rides on the cam surface from the cavity 41 to the detent ramp or cavity 42, the action of the coil spring 60 is effective to rotate the carburetor throttle plate 56 in the same direction and to the same extent, since the overhanging flange 61 of the lug 58 is held in contact with the overhanging flange 49 by the said coil spring. The carburetor throttle is accordingly moved from a closed position, FIGURE 2, to a full open position, FIGURE 3, and the transmission control lever 16 is also rotated a predetermined like extent for up-shifting the transmission at the proper engine speed to progressively higher gear ratios.

When the carburetor full throttle position is reached the overhanging flange 61 of carburetor throttle plate 56 comes against a fixed stop 63 and the pin 40 carried by the follower lever 38 will be located against the detent ramp portion 42 of the cam. For certain control purposes as regards the automatic transmission 14, it is desirable that the cam 28 be further rotated beyond the detent ramp 42, notwithstanding that the carburetor throttle plate 56 is held against a fixed stop 63 and is incapable of further rotational movement in that direction. This action is possible with the present combination of cam, carburetor throttle plate or lever 56, and coil spring 60, the through detent position of the parts being shown in FIGURE 4.

As the cam is rotated from the full throttle position of FIGURE 3 to the through ramp position of FIGURE 4, the lug 44 and overhanging flange 49 move away from the flange 61 and the lug 58. The coil spring 60 is extended to a moderate degree when this relative movement occurs. The force required on the accelerator pedal to move the cam through detent is substantial thus affording "feel" to the operator, but once through the detent the holding force is relatively light. Accordingly, the through detent or ramp position of the accelerator pedal can be held for long periods without tiring the operator. The sharp feel at the detent position and more comfortable feel in the through detent position is normally called a "disappearing type" detent. The tension spring 62 not only provide the detent force but keeps the cable assembly under constant tension which insures continual coaction of the transmission control lever 16 in reference to the clockwise and counterclockwise rotation of throttle valve cam 28.

Upon release from the over-control position, the action of the coil spring 60 is to return the cam to its full throttle position with the lug 44 and overhanging flange 49 returning into contact with the lug 58 and overhanging flange 61. This is generally referred to as the recocking feature of the control, and it will be observed that the same takes place before any closing action of the carburetor throttle. Upon full release of the accelerator pedal the main coil spring 30 and the tension spring 62 return the throttle valve cam and transmission control lever to initial position. This counterclockwise rotation of the cam closes the carburetor throttle since the lug 44 on the cam with the overhanging flange 49 will contact the lug 58 with the overhanging flange 61 and rotate the carburetor throttle lever 56 in a counterclockwise throttle-closing direction.

From the foregoing description it will be observed that the several elements of the present throttle valve control device are so combined as to provide a self-contained unit and which is attached directly to the carburetor. The contour surface of the throttle valve cam can be precisely developed for the particular characteristics of the automotive engine to which the control device is to be applied. For example, since motor truck automatic transmissions use almost exclusively the governor over-travel type, the present invention has been described in connection therewith. However, the developed contour surface of the throttle valve cam can be revised and the detent ramp portion can be omitted for those types of automatic transmissions which are without governor over-travel.

The invention is not to be limited to or by details of construction of the particular embodiment thereof illustrated by the drawings as various other forms of the device will, of course, be apparent to those skilled in the art without departing from the spirit of the invention or the scope of the claims.

What is claimed is:

1. In a control device for a carburetor throttle valve and a transmission throttle valve control lever, the combination with the throttle valve shaft of said carburetor, of a throttle lever fixed to said shaft and swingable between a first position and second angular positions corresponding to the closed and fully opened positions, respectively, of said carburetor throttle valve, a throttle valve cam mounted on said shaft for independent rotation, having a generally convex cam surface, the end portions of which correspond to the closed and fully opened positions, respectively, of the carburetor throttle valve, a detent ramp portion at the end of said convex cam surface portion corresponding to the fully opened position of the carburetor throttle valve, and a through detent pump portion beyond the detent ramp portion; a follower lever having a member in contact with the cam surface of said throttle valve cam, a cable assembly operatively connecting the follower lever with the transmission control lever whereby pivotal movement of the follower lever as determined by the cam surface of the throttle valve cam is transmitted to the transmission control lever, coacting formations on the throttle lever and throttle valve cam, respectively, said resilient means interconnecting the said lever and cam and normally maintaining the coacting formations in contact whereby rotation of said throttle valve cam to cause said follower lever member to ride on said convex cam surface effects simultaneous swinging of said carburetor throttle lever between its first and second positions, said throttle valve cam being rotatable to cause said follower member to ride over said detent ramp portion between said through detent ramp portion and said portion corresponding to the fully opened position of the carburetor throttle valve, said coacting formations on the throttle lever and throttle valve cam being separable during such latter rotational movement of the throttle valve cam against the resilient action of said resilient means to cause pivoting of said follower lever independently of any swinging movement of said throttle lever from its second angular position.

2. In a control device for a carburetor throttle valve and a transmission throttle valve control lever as set forth in claim 1 wherein said throttle valve cam is generally plate-like with said convex cam surface, detent ramp portion and through detent ramp portion are formed on the peripheral edge thereof, and said coacting formations on the throttle lever and throttle valve cam, respectively, comprise an overhanging flange provided by one member and a second overhanging flange provided by the other member and located in the path of the first mentioned flange, said flanges extending substantially parallel with respect to the axis of said throttle valve shaft.

3. A control device for a carburetor throttle valve and a transmission throttle valve control lever as defined by claim 2, wherein the cable assembly comprises a Bowden wire and said cam follower lever member is generally cylindrical with the longitudinal axis thereof substantially parallel with respect to the axis of said throttle valve shaft, one end of said Bowden wire being pivotally connected to the follower lever on the longitudinal axis of said cam follower lever member.

4. In a control device for the carburetor and automatic transmission of an automotive engine, said automatic transmission having a control lever and the carburetor having a throttle valve which is movable to and from closed and open positions, said throttle valve operatively engaging a stop when in its fully open position to limit movement in one direction, the combination with a throttle valve shaft, of a throttle lever fixed to said shaft, a throttle valve cam mounted on said shaft for independent rotation, said cam having a convex cam surface between closed and fully open throttle positions and having a detent ramp portion formed thereon at fully open throttle position and a through detent ramp portion beyond the fully open throttle position, coacting formations on the throttle lever and throttle valve cam, respectively, resilient means interconnecting the lever and cam in a manner to yieldably maintain the coacting formations in contact although permitting separation of the coacting formations against the tension of the resilient means, a pivoted follower lever having a member adapted to contact and ride on the cam surface of the throttle valve cam, a cable assembly operatively connecting the follower lever with the transmission control lever, whereby pivotal movement of the follower lever as determined by the cam surface of the throttle valve cam is transmitted to the transmission control lever, and means for rotating the cam from a throttle closed position to a fully open position and then through said detent ramp portion, said rotation of the cam through said detent ramp portion effecting separation of the coacting formations against the tension of the resilient means since the throttle valve, throttle valve shaft and throttle lever are held against further movement beyond a fully open position.

References Cited
UNITED STATES PATENTS

| | | | |
|---|---|---|---|
| 2,645,947 | 7/1953 | Lendved et al. | 74—472.2 |
| 2,657,779 | 11/1953 | Wiig | 192—3.5 |
| 2,770,146 | 11/1956 | Winkler | 74—472.2 |
| 2,867,132 | 1/1959 | Schroeder | 74—472.2 |
| 2,870,649 | 1/1959 | Zemke | 74—472.2 |
| 3,034,373 | 5/1962 | Walker | 74—472.2 |

FRED C. MATTERN, JR., *Primary Examiner.*

DAVID J. WILLIAMOWSKY, *Examiner.*

C. J. HUSAR, *Assistant Examiner.*